US005413665A

United States Patent [19]

Gaetano

[11] Patent Number: 5,413,665

[45] **Date of Patent: * May 9, 1995**

[54] APPARATUS FOR MOUNTING FILM NEGATIVES

[75] Inventor: Ralph R. Gaetano, Bethel Park, Pa.

[73] Assignee: Think, Inc., Pittsburgh, Pa.

[ * ] Notice: The portion of the term of this patent subsequent to Dec. 21, 2010 has been disclaimed.

[21] Appl. No.: 985,304

[22] Filed: Dec. 4, 1992

Related U.S. Application Data

[63] Continuation of Ser. No. 715,498, Jun. 14, 1991.

[51] Int. Cl.[6] ..................... B32B 7/06

[52] U.S. Cl. ..................... 156/514; 83/29; 83/33; 83/879; 40/159.2; 40/156; 40/359; 40/360; 156/519; 156/108; 53/520

[58] Field of Search ..................... 156/514, 516, 518, 519, 156/108, 513; 53/520; 83/29, 33, 879; 40/159.2, 156, 359, 360

[56] References Cited

U.S. PATENT DOCUMENTS

| | | | |
|---|---|---|---|
| 2,277,969 | 3/1942 | Grant | 88/26 |
| 2,311,946 | 2/1943 | Kroner | 40/158 |
| 2,639,254 | 4/1953 | Smith | 154/116 |
| 2,804,202 | 8/1957 | Davis | 206/62 |
| 2,819,656 | 1/1958 | Patterson | 93/1 |
| 2,875,672 | 3/1959 | Cross | 93/1 |
| 2,889,066 | 6/1959 | Alborty | 156/475 |
| 2,951,304 | 9/1960 | Herte | 40/158 |
| 2,969,300 | 1/1961 | Frantz | 156/516 |
| 2,977,017 | 3/1961 | Herzig | 216/62 |
| 3,235,991 | 2/1966 | Harper et al. | 40/158 |
| 3,264,154 | 8/1966 | Kiehl | 156/108 |
| 3,264,767 | 8/1966 | Coffman | 40/102 |
| 3,271,218 | 9/1966 | Ott et al. | 156/108 |
| 3,291,669 | 12/1966 | Osher | 156/73 |
| 3,418,119 | 12/1968 | Schwartz et al. | 96/27 |
| 3,564,745 | 10/1968 | Johnson | 40/159.2 |
| 3,693,510 | 9/1972 | Langan | 93/1 |
| 3,743,400 | 7/1973 | Haning et al. | 353/25 |
| 3,761,344 | 9/1973 | Mrozek | 156/299 |
| 3,779,786 | 12/1973 | Tone | 117/4 |
| 4,132,480 | 7/1977 | Reed | 40/159.2 |
| 4,285,754 | 8/1981 | DiMatteo | 156/513 |
| 4,312,691 | 1/1982 | Rosenbloom | 156/514 |
| 4,333,784 | 6/1982 | McCarthy | 156/514 |
| 4,339,886 | 2/1982 | Griffiths | 40/595 |
| 4,405,228 | 9/1983 | Muscoplat | 355/75 |
| 4,426,242 | 1/1984 | Sankans | 156/252 |
| 4,443,099 | 4/1984 | Linman et al. | 355/75 |
| 4,542,286 | 12/1982 | Golanz | 235/377 |
| 4,548,493 | 10/1985 | Mayfield | 355/125 |
| 4,585,506 | 4/1986 | Matsuguchi | 156/361 |
| 4,664,416 | 5/1987 | Steidinger | 282/11.5 |
| 4,665,681 | 5/1987 | Facchini et al. | 53/520 |
| 4,696,706 | 9/1987 | Griffin | 156/62 |
| 4,713,901 | 12/1987 | Wells | 40/360 |
| 4,822,445 | 4/1989 | Yamaguchi | 156/514 |
| 4,931,127 | 6/1990 | Matsumoto | 156/363 |
| 5,045,135 | 9/1991 | Meissner | 156/64 |
| 5,271,792 | 12/1993 | Gaetano | 156/514 |

FOREIGN PATENT DOCUMENTS 0041211 12/1981 European Pat. Off. .

*Primary Examiner*—W. Gary Jones

*Assistant Examiner*—Mark De Simone

*Attorney, Agent, or Firm*—Stanley J. Price, Jr.; John M. Adams

[57] ABSTRACT

A web of cardstock divided by transverse score lines includes card segments having apertures oriented with respect to an optical center point of each card segment. The web is continuously fed from a supply of cardstock by engagement of a tractor feed device with tracks of holes extending along the longitudinal edges of the web. A selected one of the holes serves to locate the optical center point of each card segment as the web is fed to a film mounting station. Film negatives cut from a strip of developed film are sequentially positioned in registry with the optical centers in the apertures of the card segments as the web advances through the film mounting station. An adhesive releasably secures the negatives in overlying relation with the apertures on one side of the cards to expose through the apertures a selected composition of the negatives. The mounted negatives are fed on the connected card segments through a machine for printing proofs followed by matching each proof with a mounted negative to determine if the composition of the proof should be adjusted by repositioning the film negative with respect to the aperture. Other adjustments, such as cropping the negatives, are performed as desired followed by final printing of the customized film negatives.

20 Claims, 5 Drawing Sheets

APPARATUS FOR MOUNTING FILM NEGATIVES

CROSS REFERENCE TO RELATED APPLICATION

This application is a continuation of copending prior application Ser. No. 715,498 filed on Jun. 14, 1991 entitled "Method And Apparatus For Mounting Film Negatives".

BACKGROUND OF THE INVENTION

1. Field of the Invention

This invention relates to film negative mounting cards and more particularly to a continuous web of cardstock divided into apertured segments for sequentially receiving cut film negatives in registry with the apertures on the continuous web.

2. Description of the Prior Art

It is well known in the photography industry to use aperture cards or "crop" cards in the mounting of film negatives to permit the professional photographer to improve the quality of composition of the photographs printed from the film negatives. By selectively positioning the film negative opposite the aperture in the card, the desired content of the film negative is centered in the aperture. Undesirable objects present in the photographic field are thereby deleted.

Conventional aperture cards contain openings for a pin registry system which is standard in the industry. The pin registry facilitates consistent and reliable reference to the optical center of the card and the film negative. Typically, the pin registry system includes locating the optical center of the card by measuring one half of the distance between a top registry hole and a bottom registry hole. A vertical line through the center of the two registry holes is bisected by a horizontal line. The horizontal line defines the vertical center of the card. By measuring a predetermined distance horizontally from the point of intersection, the optical center of any given card can be determined.

A crop card is used to reduce the size of the aperture opening and thereby reduce the exposed area of the negative. In this manner, undesirable subject matter present in the negative is eliminated, and the composition of the print to be developed is customized to the choice of the photographer. By mounting a film negative to a crop card, a photographer is able to accurately communicate to the processing laboratory or developer his instructions for cropping the image. While the accuracy of communication enhances the overall photographic quality, the amount of time consumed by viewing the negatives and attaching them to the desired optical center places the processing laboratory in conflict with the photographer, since neither desires to assume responsibility to perform these tasks.

Photographers generally consider the task of cropping to be rote and counterproductive. The processing laboratories typically consider these tasks to be in the nature of creative composition or enhancement features. Laboratories are reluctant to take responsibility for cropping as unsatisfactory results will be ultimately attributed by the photographer or studio to the laboratory. The photographer on the other hand is unwilling to expend the amount of time necessary to achieve the desired results in so far as the composition of the photograph.

A large percentage of photographs do not require qualitative evaluation because conventional negative mounting cards include cropping devices and employ techniques which provide composition regarded as acceptable "as taken". However, current practice dictates that every negative be viewed and attached to an aperture card by hand. This is a time consuming task which increases the expense of photographic development and reduces the efficiency between the photographer/studio and laboratory.

A known example of mounting photographic transparencies for projector viewing in sequence on a strip of thin flexible back up film is disclosed in published European Patent Application No. 0 041 211. The strips consist of two similar film parts with apertures matching the size of the transparency. The transparency is fitted inside the mask. The second strip is then laid over the row of masks and bonded. Apertures are of such dimension that a developed transparency may be mounted either vertically or horizontally as the image may dictate so that when viewed the strip projects each image in proper orientation.

U.S. Pat. No. 3,271,218 is considered relevant for the disclosure of a method of making prepopped film transparency slides. At least two opposite marginal portions adjacent to the image area are bent prior to insertion in a mount so as to lie in planes other than the normal plane of the transparency. When the transparency is mounted in a conventional mount, closing of the mount halves forces the marginal portions into a common plane, imparting curvature to the intervening image area. Abrupt shifting or flexing, otherwise referred to as popping, is thereby eliminated.

U.S. Pat. No. 3,779,786 discloses a method for manufacturing microfilm record cards from a substantially continuous web of cardstock. The web of cardstock is conveyed along a predetermined path, and it is embossed as it is moved along the path to raise a portion above the surface of the surrounding web. The web is then ground to form a rectangular ground area on the raised surface. The ground area is de-embossed and an aperture is formed through the web in the ground area. After the web is printed, it is cut into individual record cards which are stocked for transfer to a film mounting apparatus.

Methods for making or mounting transparent slides are well known in the art as disclosed in U.S. Pat. Nos. 2,277,969; 3,235,991; 3,264,154; and 4,665,681. U.S. Pat. No. 2,277,969 discloses a lantern slide folder that includes a plurality of slide holders each, including a front panel and a rear panel with the panels aligned and the panels having aligned apertures therein. The panels are suitably secured together by glue disposed between their marginal edges. The panel supports a transparency, such as color film, by engagement with the edges thereof. The holders are secured in hinged relation by upper and lower adhesive, strips or tape.

U.S. Pat. No. 3,235,991 discloses another paper mount for photographic transparencies. The transparency mount includes a generally rectangular cardboard support having apertures cut therein. The apertures are spaced so that when the mount is folded along a weakened line the apertures will be automatically registered to frame a transparency lying in a transparency seat. The transparency is located in the seat by means of raised dots which act as both spacing and aligning means and also as adhesive means when heat is applied to the completed mounted transparency.

U.S. Pat. No. 3,264,154 discloses a method for making picture slides. A roll of continuous paperboard having pressure-sensitive adhesive on one side and masked by a continuous removable strip or backing is printed with a desired repeated legend or pattern opposite to the pressure sensitive adhesive. The paperboard is cut to provide windows before being formed into the roll. The continuous paperboard and strip are drawn across a knife disposed transversely thereto. The knife cuts the continuous paperboard into pieces but does not penetrate the backing strip. The backing strip is peeled from the pieces onto a roll just before the pieces pass through a mechanism which receives and segments the continuous picture film and applies the segments through selected windows. The segments are a little larger than the windows and are secured in place by pressure-sensitive adhesive. The lightly attached pieces are folded into adjacent relationship. The pressure-sensitive adhesive holds the pieces firmly together to secure the film segments therebetween.

U.S. Pat. No. 4,665,681 discloses a method and apparatus for automatically or manually mounting photographic films into mounts mechanically openable at one side.

U.S. Pat. No. 2,804,202 discloses a folding case for shipping and viewing film slides. The case comprises an elongated sheet of material which is sectioned by transverse score lines into a series of connected segments or panels. Uncut surface layers at the base of each of transverse scores lines provide a series of one-way hinges, each being oriented oppositely from the next hinge in the series. Alternate panels of the series are provided with openings or windows. Mounted slides are inserted in the openings and locked in place.

U.S. Pat. No. 3,264,767 is considered relevant for a disclosure of a pin registration system of producing slide transparencies for overhead projections. A plurality of image bearing film sheets are arranged in superposed relation. A series of master sheets are placed in overlying relationship to each other on an overhead projector. The pin registration allows for alignment with a sequence of images so as to superpose images which relate to each to form a complete image from several disjunctive images.

U.S. Pat. No. 2,311,946 discloses a processing device for the representation of objects. Sections of cellophane material contain pictures. Double folded strips of the transparent material are superposed in relation to one another to illustrate successive use of an object or objects. Combinational pictorial representations of the objects are obtained.

U.S. Pat. No. 3,418,119 discloses a method of cumulatively recording intelligence on a record sheet. A plurality of photographic images each representing one entry of a cumulative record occupy one of several predetermined fractional areas of a card. Remaining fractional areas are shielded. A sequence of entries represent a continuing transaction in numerical and chronological order.

While it is well known to mount slide transparencies, as well as film negatives on aperture cards, the known devices and methods require first preparation of individual mounting or aperture cards and second automatic or manual assembly of the individual transparency in the aperture card. This is a time consuming task, particularly for aperture cards that receive transparencies between overlying layers. Also the structure of known aperture cards does not facilitate efficient adjustment in the composition of a film negative visible through the aperture of the card. Therefore, there is need for a film negative mounting or aperture card having a construction that facilitates efficient mounting of the film negative or transparency and permits ease of adjustment in selecting the composition of the negative visible through the aperture of the card.

SUMMARY OF THE INVENTION

In accordance with the present invention, there is provided apparatus for mounting film negatives that includes a web of cardstock having a substantially continuous length defined by longitudinal edges and a preselected width uniform along the length of the web. A plurality of transverse score lines extend in spaced parallel relation across the width of the web and spaced equidistant apart to form a plurality of connected card segments. The card segments are separable one from another along the score lines. The card segments have uniform dimensions where each card segment is defined by a top edge and a bottom edge formed by the web longitudinal edges and a leading edge and a trailing edge defined by the transverse score lines. Tracks of holes in each card segment are positioned closely adjacent and parallel to a selected one of the top and bottom edges, respectively. The tracks of holes of adjacent card segments are aligned to form a continuous track of holes at the longitudinal edges of the web for engagement with a tractor feed device for feeding the connected card segments along a feed path. An optical center point is positioned on each card segment. Alignment means on each card segment locates the optical center point thereon so that the optical center points of the card segments are located in the same position for each card segment. A window of a preselected geometric shape is provided on each card segment. The window is located on the card segment in a preselected position with respect to the optical center point. Means is provided for releasably securing the film negative to the card segment in the preselected position overlying the window.

Further in accordance with the present invention there is provided a method for mounting film negatives comprising the steps of storing a supply of mounting cards in a continuous web of cardstock with each card including a window of a preselected geometric shape. The individual mounting cards connected to one another in the web of cardstock are separated by score lines extending transversely across the web of cardstock. The web of cardstock is fed to a film negative mounting station. The developed film negatives are fed to the film negative mounting station. The web of cardstock is advanced through the film mounting station. Individual film negatives are sequentially positioned opposite one side of the web of cardstock as the web advances through the film mounting station. The film negative is aligned with the window in the card so that the image on the negative is visible through the window. The film negative is releasably attached in registry with the window to one side of the card. The web of cardstock is advanced with the film negatives thereon from the film mounting station for subsequent handling.

Further the present invention is directed to a system for mounting film negatives on aperture cards that includes a supply of aperture cards formed on a continuous web of cardstock. The aperture cards are connected to one another for separation along transverse score lines. The transverse score lines are equally spaced apart to provide the aperture cards with a uniform dimension. Each of the cards in the continuous web has an aperture of a preselected shape and size and a plurality of spaced apart holes extending along opposite lateral edges of the card. Tractor feed means engage the holes to advance the web of cardstock from the supply along a feed path. A supply of film negatives is fed in a continuous strip. A mounting station sequentially receives the strip of film negatives and the web of aperture cards. Means is provided for cutting the film negatives from the strip and positioning the cut film negatives in registry with the card apertures respectively at the mounting station. Means is provided for releasably mounting the film negatives onto the web of aperture cards in a registry with the apertures. Means is provided for feeding the web of aperture cards with the film negatives attached thereto from the mounting station. A printer prepares proofs from the film negatives which are mounted on the web of aperture cards. Each print corresponds to the portion of the film negative visible through the card aperture. At a handling station the printed proofs are matched with the corresponding film negatives mounted on the aperture cards.

Accordingly, a principal object of the present invention is to provide method and apparatus for mounting film negatives or transparencies on aperture cards formed on a continuous web of cardstock where a selected portion of the negative is centered in the aperture of the card.

Another object of the present invention is to provide a continuous web of cardstock containing aperture cards connected to one another by transverse score lines that facilitates the separation of the cards one from another after individual film negatives are releasably attached to the continuous web in overlying relation with the apertures as the web is continuously fed to receive the individual film negatives.

A further object of the present invention is to provide a system for efficiently mounting cut film negatives on aperture cards for obtaining proofs that correspond to the portions of the film negatives visible through the apertures to facilitate a comparison between the proofs and corresponding film negatives to determine if the desired composition of the film negatives appears in the apertures of the cards before the final print of each negative is produced.

Another object of the present invention is to provide a method for changing the composition of the image to be developed from a film negative mounted on an aperture card by selective repositioning of the film negative on the aperture card to obtain the desired composition of the film negative visible through the aperture, which composition will correspond to the final print.

An additional object of the present invention is to provide a continuous web of cardstock containing separable aperture cards that are tractor fed from a roll of cardstock to a film cutting and mounting station where cut film negatives are placed in registry with the card apertures as the cardstock is being continuously fed from the roll.

These and other objects of the present invention will be more completely disclosed and described in the following specification, the accompanying drawings, and the appended claims.

DESCRIPTION OF THE PREFERRED EMBODIMENTS

Figure 1:
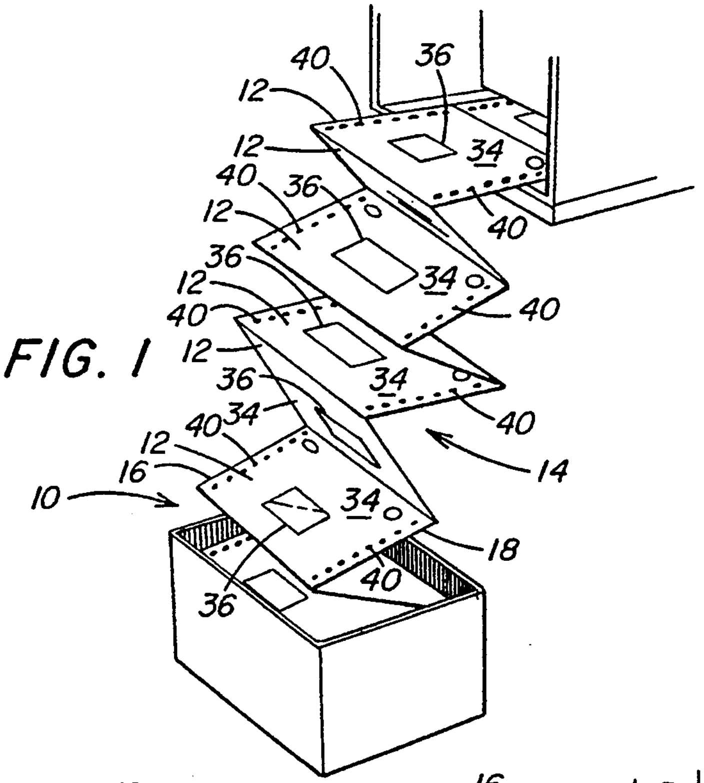
FIG. 1 is a schematic illustration of a supply of cardstock that is fed in a continuous web for sequential mounting of cut film negatives on card segments of the web.
Figure 2:
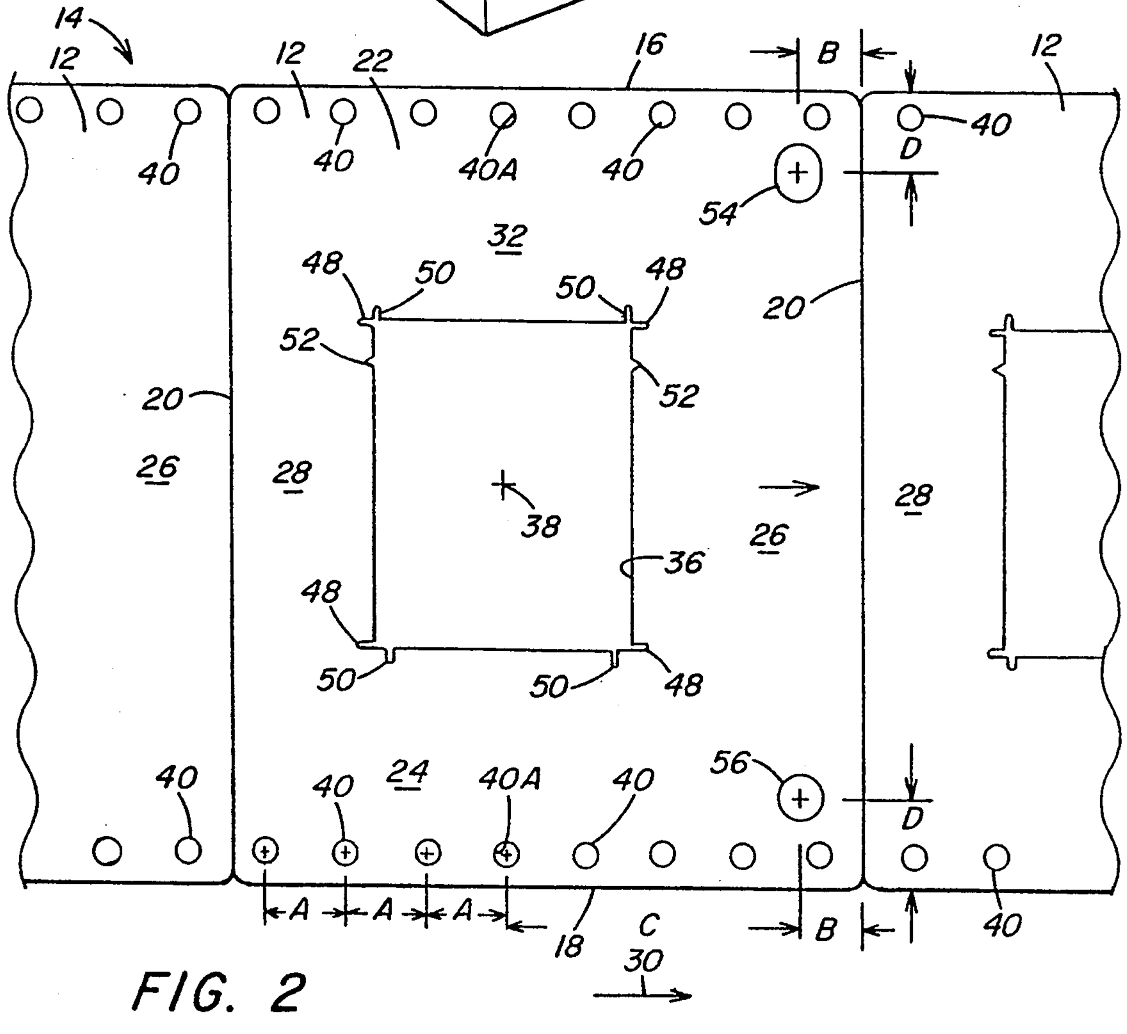
FIG. 2 is an enlarged fragmentary plan view of the cardstock shown in FIG. 1, illustrating the individual card segments of the web separated from one another by transverse score lines.
Figure 3:
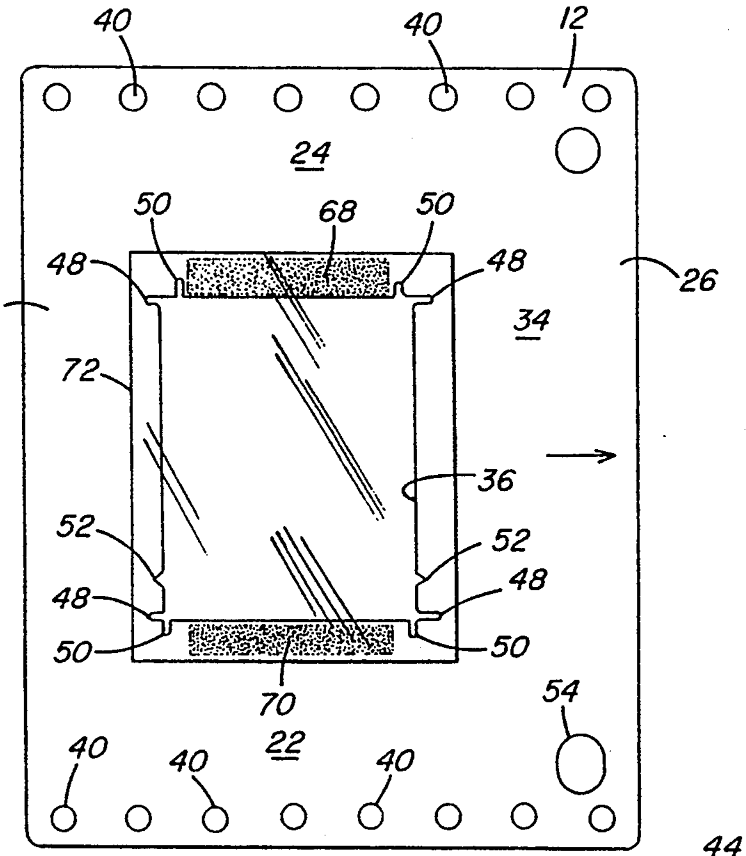
FIG. 3 is a schematic illustration of an individual card segment separated from the continuous web shown in FIGS. 1 and 2, illustrating a cut film negative releasably attached to one side of the card segment.

Referring to the drawings and particularly to FIGS. 1–3, there is a illustrated a supply of cardstock generally designated by the numeral 10 of aperture or mounting cards 12 connected in a continuous web generally designated by the numeral 14 for use in mounting individual film negatives, transparencies, and the like. The web 12 of cardstock 10 is sufficiently flexible and capable of bending without deformation to permit the cardstock 10 to be stored in a roll of material, as well as in a fan-fold stack as shown in FIG. 1.

The web 14 of cardstock 12 has a substantially continuous length defined by longitudinal edges 16 and 18 and a preselected width uniform along the entire length of the web 14. A plurality of transverse score lines 20 extend in spaced parallel relation across the width of the web 14. The score lines 20 are equidistant apart to form a plurality of hinges connecting the card segments 12. By hingedly connecting the card segments 12 in the web 14 the segments 12 can be folded in overlying relation with respect to one another, while remaining connected to one another. This permits the connected card segments to be initially stored in a fan-fold arrangement as shown in FIG. 1. However, it should also be understood that the connected card segments 12 may be stored in roll form. The card segments 12 are separable from one another by severing the web 14 along the score lines 20. An individual card segment 12 severed from the web 14 is shown in FIG. 3.

The card segments 12 have uniform dimensions where each card segment has an identical length and width. Each card segment 12 is defined by a top edge portion 22 and a bottom edge portion 24 corresponding to the longitudinal edges 16 and 18, respectively of the continuous web 14. Extending perpendicularly to the top and bottom edges 22 and 24 are a leading edge portion 26 and trailing edge portion 28 for a direction of feed identified by the arrow 30 in FIG. 2. The leading and trailing edge portions 26 and 28 are formed when the respective card segments 12 are separated from the web 14. Upon separation of the card segments 12 from the web 14 the leading edge portion 26 of each card segment is positioned adjacent to the trailing edge portion 28 of the forward card segment. Correspondingly, the trailing edge portion 28 of each card segment is positioned adjacent the leading edge portion 26 of the rearward card segment.

Each card segment 12 includes a front surface 32, as shown in FIG. 2, and a back surface 34, as shown in FIGS. 1 and 3. Located within the body of the card segment 12 is an aperture or window 36 of a preselected size and geometric shape. Preferably the aperture 36 is either square or rectangular in configuration. Regardless of the shape of the aperture 36, it is located in a preselected position on the card segment with respect to an optical center point 38 of each card segment 12, as shown in FIG. 2.

Tracks of holes 40 to receive a tractor feed device are provided in each card segment and are aligned with the tracks of holes 40 of adjacently positioned card segments 12 to form tracks of holes 40 that are continuous the entire length of the web 14. Preferably the holes 40 are spaced a selected distance A apart so that each card segment 12 has an identical number of holes which are identically positioned on each card, as shown in FIG. 2.

In one embodiment, a single row of holes 40 is positioned closely adjacent and parallel to a selected one of the top and bottom edge portions 22 and 24. In a second embodiment, as shown in FIG. 2, opposite rows of holes 40 are positioned closely adjacent and parallel to top and bottom edge portions 22 and 24 respectively. In both embodiments the holes 40 are spaced equidistant apart with the number of holes 40 at each edge portions 22 and 24 being identical for each card segment 12. Thus, the pattern of holes at the edge portions 22 and 24 is identical for each card segment 12.

Figure 4:
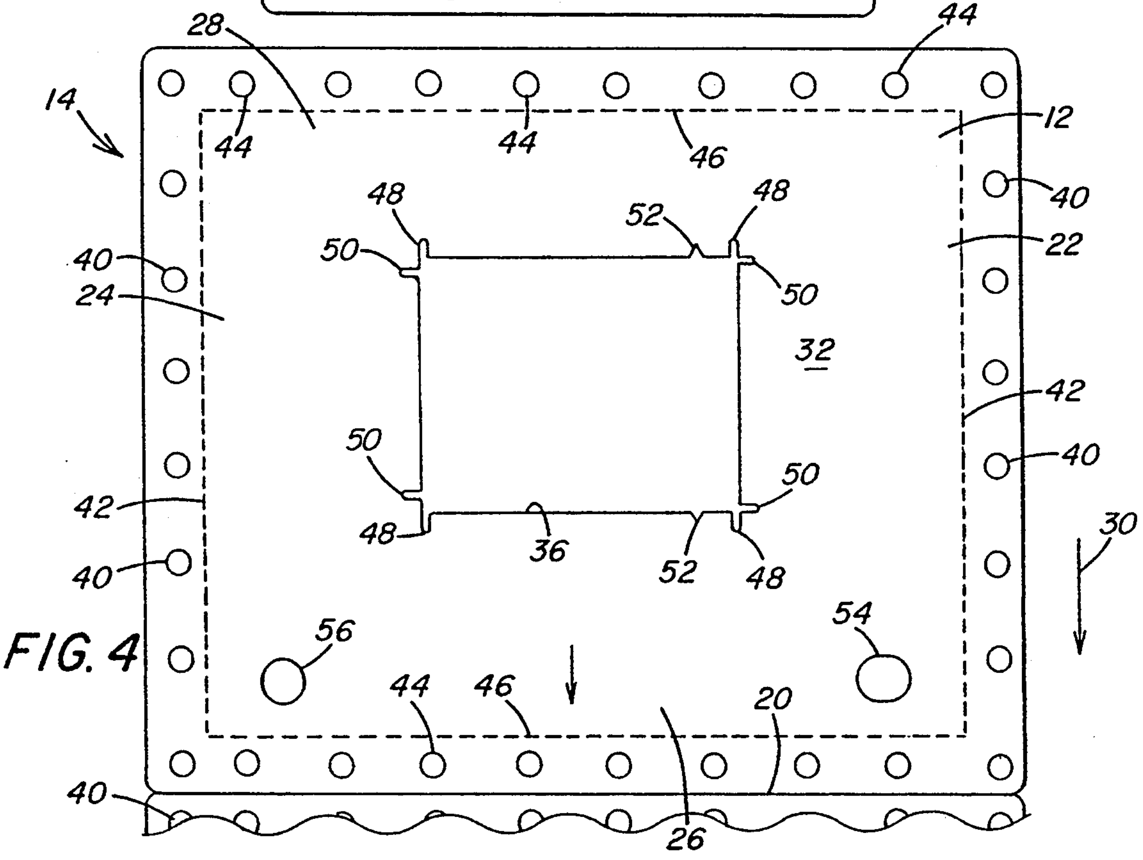
FIG. 4 is a plan view of an alternate embodiment of card segments in the web of cardstock.

An alternate embodiment of the card segments 12 is shown in FIG. 4. The holes 40 positioned along the edge portions 22 and 24 are separated from the body of the respective card segment 12 by a tearline 42 which facilitates removal of the holes 40 from the segments 12 once the card segments are separated from one another along the score lines 20. When the holes 40 are removed, the tearline 42 forms the respective top and bottom edges 22 and 24 shown in FIG. 2. Additionally, transverse tracks of holes 44 are provided in each card segment 12 closely adjacent and parallel to the score lines 20. The holes 44 can be provided along one or both score lines 20 of each card.

Once card segments 12 have been separated from one another and the holes 40 removed from the body of the card, the holes 44 are available for use. Similarly a tearline 46 separates the perforations 44 from the leading and trailing edge portions 26 and 28 of each card segment 12. Severing the card segment along the tearline 46 permits removal of the holes 44 from connection to the card segment 12. Also the holes 44 are equally spaced from one another along the respective edge portions 26 and 28. The patterns of holes 44 are common to all the card segments 12.

With the embodiment of the card segments 12 shown in FIG. 4, the dimensions of the web 14 of cardstock are increased to provide for the portions of the card segments containing the holes 40 and 44. Thus, when the portions of the web containing the holes 40 and 44 are removed, the card segments 12 have a dimension corresponding to the dimensions of the embodiment of the card segments shown in FIG. 2 where the holes 40 are not removed from the card segments and the transverse holes 44 are not used.

In accordance with the present invention the optical center point 38 for each card segment 12 is located in a preselected position on the card segment by alignment with a selected one of the holes 40 at the top and bottom edges 22 and 24. For example, as shown in FIG. 2 the optical center point 38 is positioned on a line that extends between a selected pair of the holes 40, such as holes 40A shown in FIG. 2. The location of the optical center point 38 on the line that extends through the holes 40A is determined by a horizontal line positioned a preselected distance from the respective top and bottom edge portions 22 and 24.

In one embodiment the horizontal line would be located at the midpoint between the holes 40A. The aperture 36 is selectively positioned with respect to the optical center point 38. In one example, the center point 38 is positioned in the center of the aperture 36.

The aperture 36 of each card segment 12 includes horizontal cropping slots 48 and vertical cropping slots 50. The cropping slots 48 and 50 identify for the photographer or the lab technician that portion of the negative visible in the aperture 36 which will not appear in the printed proof. This portion is an allowed tolerance. In addition, each window or aperture 36 includes a pair of oppositely positioned head portrait slots 52 which indicate to the photographer the recommended location to place the head of the subject in a portrait. Thus, for example, when positioned between slots 52 the top of the subjects head will appear, approximately, $1\frac{1}{8}$ inches from the top edge of an $8\times10$ photographic print.

Further as illustrated in FIG. 2 each card segment 12 includes an oblong pin registry hole 54 and a circular pin registry hole 56, both centered on a line spaced a distance B, for example 0.375 inch as shown in FIG. 2, from and parallel to the leading edge 26 or score line 20. Also the holes 54 and 56 are spaced a distance C from the hole 40A which is used to locate the optical center point 38 of the card segment. Thus, the holes 54 and 56 serve as reference points in locating the optical center point 38 of the card segment 12.

The oblong pin registry hole 56 is positioned adjacent the corner of the card segment 12 where the top edge portion 22 intersects the leading edge portion 26. More specifically, in one example of the present invention, the oblong pin registry hole 54 has a vertical diameter of 0.375 inch and a horizontal diameter of 0.28125 inch. The vertical axis center point of the registry hole 54 is also spaced a distance D, for example 0.53125 inch, from the edge 16. In addition, the circular pin registry hole 56 has, for example, a diameter of 0.28125 inch where the center of hole 56 is also spaced a distance D, for example 0.53125 inch, from bottom edge 18.

As indicated above the pin registry holes 54 and 56 can be used as reference points to locate the optical center point 38 of each card segment 12. In one example, the optical center point 38 lies on a horizontal axis located midpoint between the centers of the holes 54 and 56. Further for example, this horizontal axis is spaced $3\frac{7}{8}$ inches from the centers of the holes 54 and 56.

As will be explained later in greater detail, an individual film negative is mounted on each card segment 12 in the web 14 of cardstock. Thereafter, the connected card segments 12 are conveyed to a mounting station for printing of the mounted film negatives. In this operation the pin registry holes 54 and 56, being oriented with respect to center point 38 of the card segment 12, serve to correctly position the card segment 12 relative to the light source used in exposing the film negative.

In accordance with the present invention, individual cut film negatives are mounted on each of the card segments 12 with the card segments connected to one another in the web 14. First web 14 is continuously fed from the supply 10 of cardstock on a roll or in a fan folded stock, as shown in FIG. 1, by operation of a tractor feed device generally designated by the numeral 58 in FIG. 5. The tractor feed device 58 is conventional in construction and includes a plurality of pills 59 circumferentially spaced around the periphery of a rotating cylinder. The pins are spaced to correspond to the spacing between tracks of holes 40 on the web 14 of cardstock. Clockwise rotation of the tractor feed device 58 generates movement of the web 14 of connected card segments 12 along a feed path in a direction indicated by the arrow 30 in FIG. 4.

Figure 5:
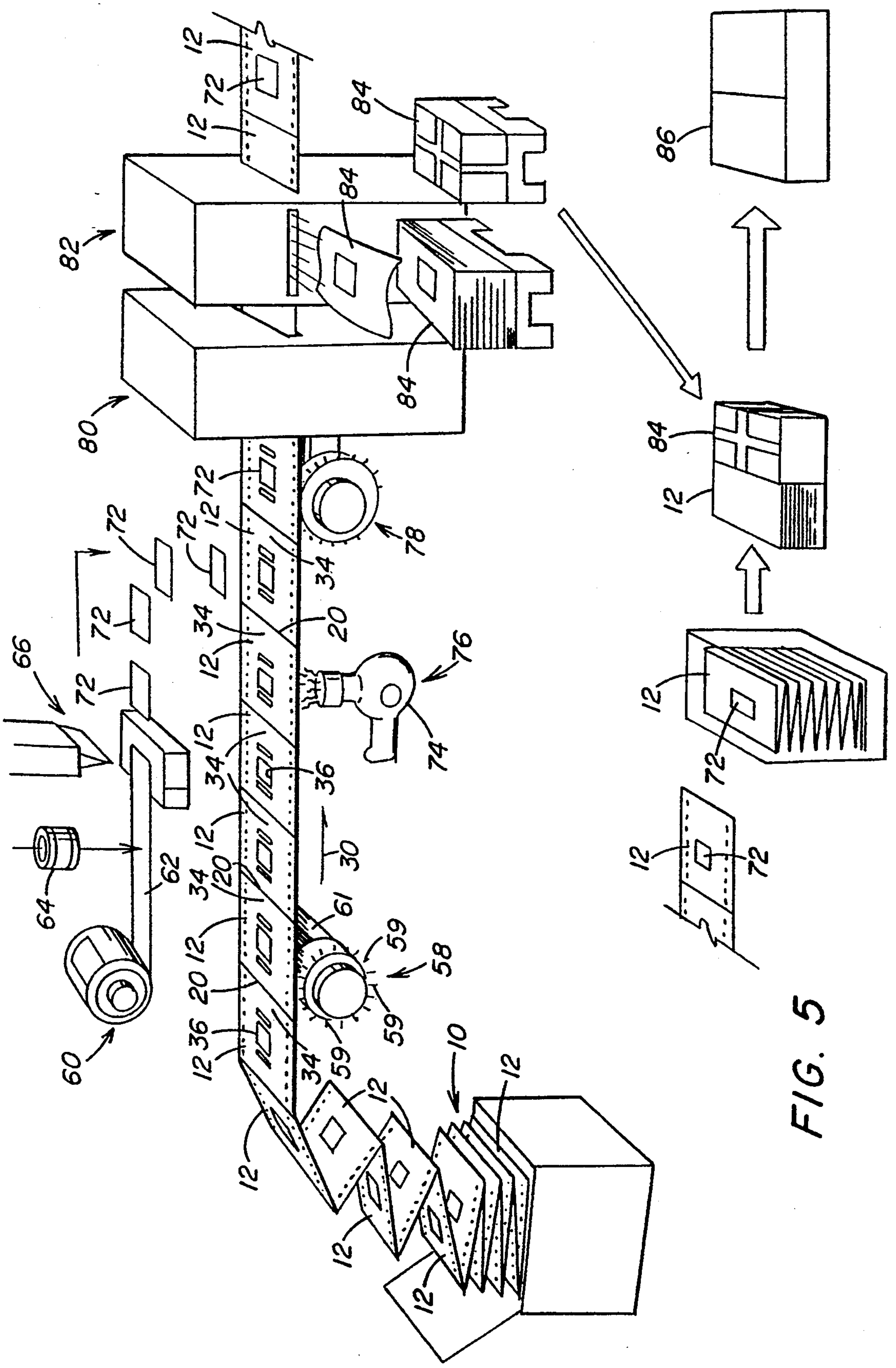
FIG. 5 is a schematic illustration of the system for mounting cut film negatives onto aperture cards, illustrating the continuous web of cardstock containing the aperture cards fed to receive cut film negatives positioned in registry with the apertures of the card segments.
Figure 6A:
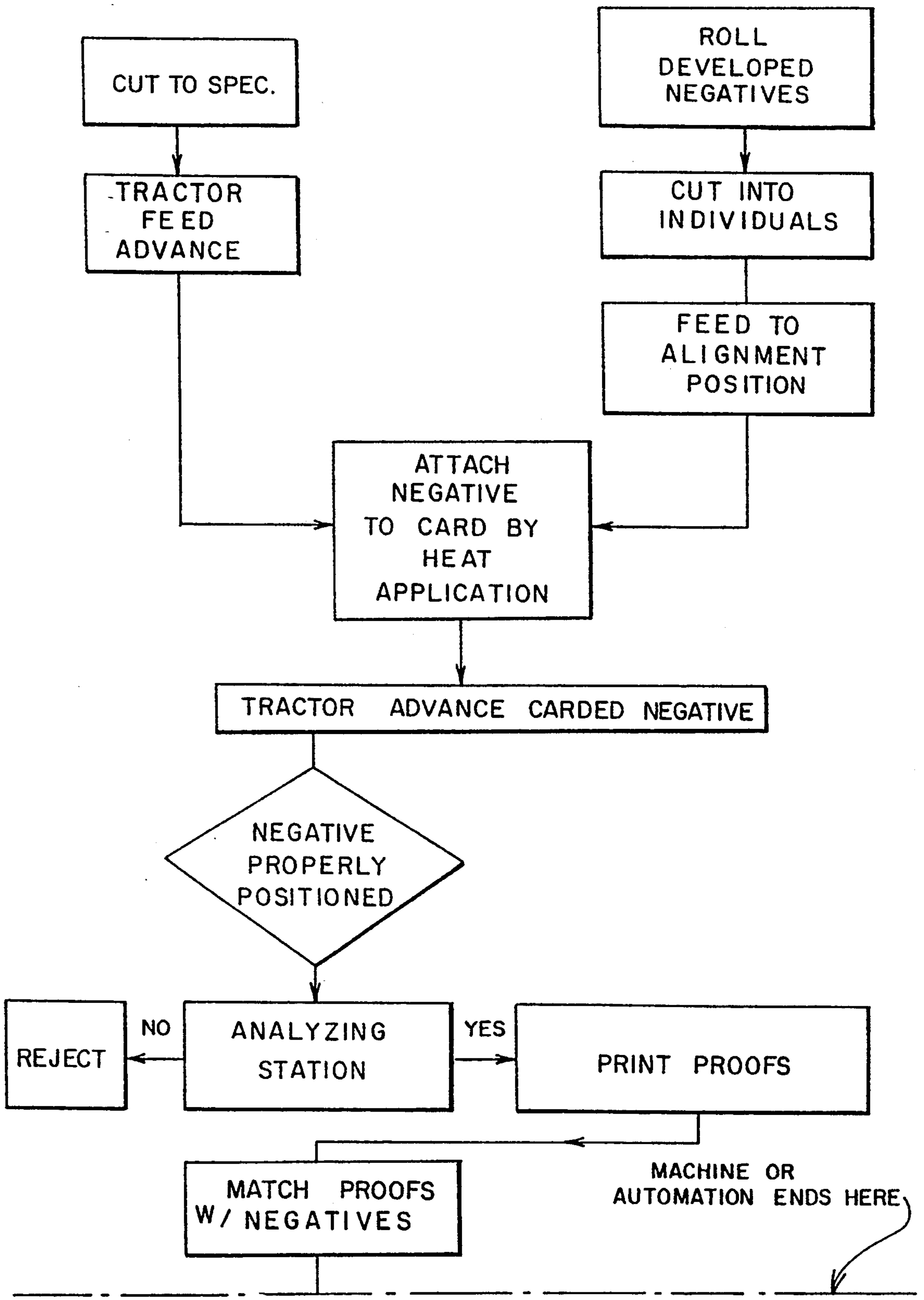
FIGS. 6A and 6B are flow charts of the steps performed in mounting the film negatives on the aperture cards in accordance with the present invention.
Figure 6B:
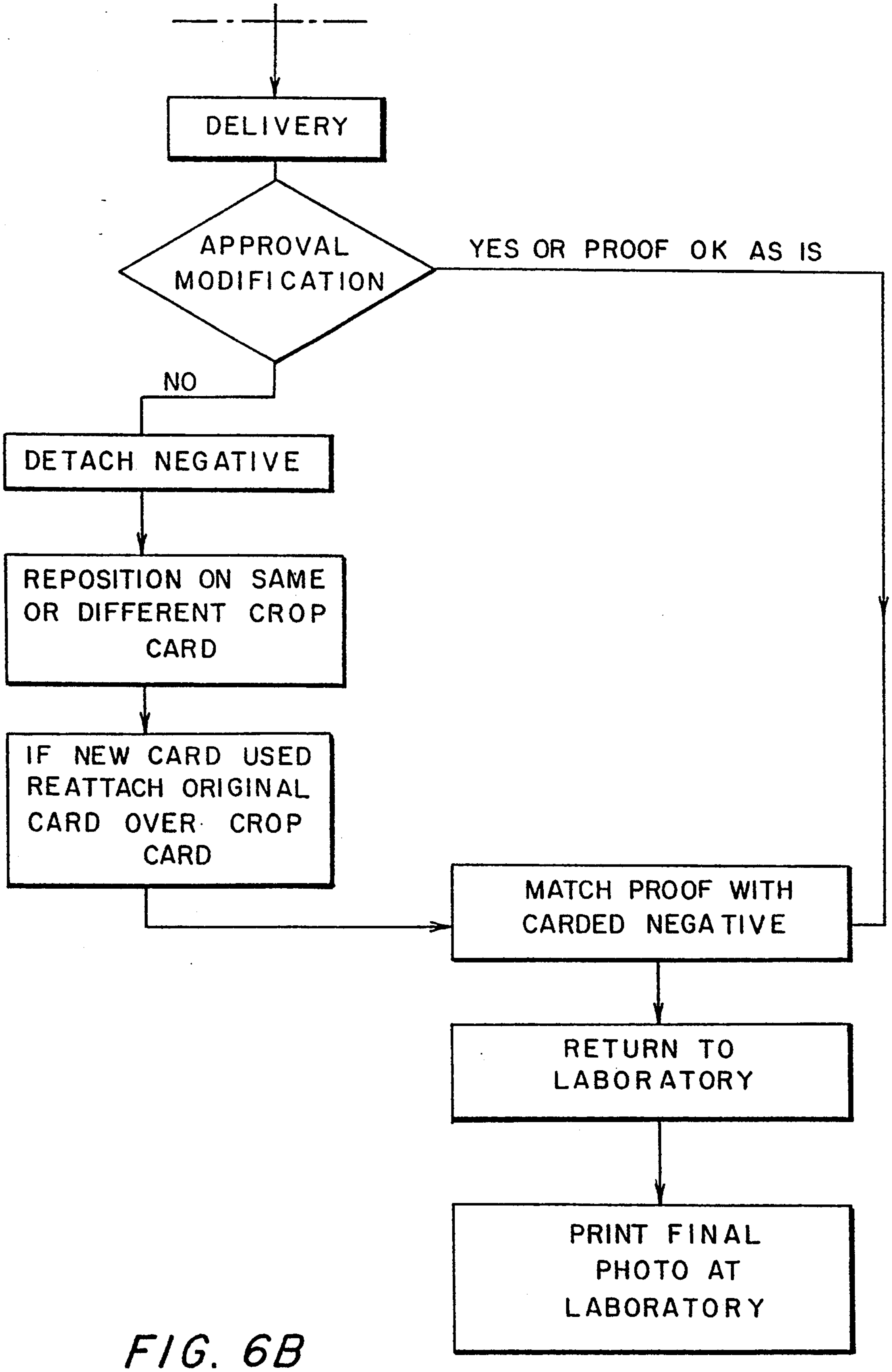

As schematically illustrated in FIG. 5 and disclosed by the flow chart in FIGS. 6A and 6B, a roll of film to be developed generally designated by the numeral 60 is fed in a continuous strip 62 through a conventional film negative developer 64. The negatives are developed as they are fed from the roll 60. The strip 62 of developed negatives is then fed to a film mounting station generally designated by the numeral 66. Simultaneously the web 14 of cardstock is advanced by the tractor feed device 58 to the negative film mounting station 66.

Referring to FIG. 3, there is illustrated an individual card segment 12 separated from the web 14. The back surface 34 of the card segment 12 is shown in FIG. 3 and includes strips 68 and 70 of an adhesive. The strips 68 and 70 are applied to the web 14 of cardstock during manufacture of the cardstock to include the connected card segments 12. In addition during the initial manufacture of the cardstock to include the connected segments 12, each segment may be printed in a commercial manner with a bar code for identifying the respective card on which a negative will be mounted. The bar code may include selected information such as the identity of the studio, density of negative, color balance of negative, order number and the like.

The adhesive strips 68 and 70 are conventional and may include in one embodiment heat activated adhesive applied in liquid form by adhesive roll application (not shown) to the web 14. The liquid adhesive after it is applied to the web 14 dries and is later activated by heat.

In another embodiment the strips 68 and 70 includes conventional non-permanent pressure sensitive adhesive. In a further embodiment the strips 68 and 70 are formed by pressure sensitive tape. In all cases the adhesive strips 68 and 70 are applied to the back 34 of each card segment when the web is stamped to form the connected card segments. It should be understood that the adhesive strips 68 and 70 secure the film negatives to the card segments 12 to hold them in place but at the same time permit their removal for repositioning with respect to the windows 36.

As shown in FIG. 5 the negative film strip 62 is cut into individual film negatives 72. The cut film negatives 72 are then sequentially positioned at the mounting station 66 opposite the back surface 34 of each card segment 12 in registry with the optical center 38 of the card. The positioning of the cut negatives 72 on the card segments 12 is performed manually or automatically by suitable mechanical means. The individual film negative 72 is first placed in registry with the card window 36. Then, the negative 72 is pressed into contact with the back surface 34 of the card segment 12 into overlying relation with the adhesive strips 68 and 70. Preferably, the base side of the negative 72 is placed in contact with the adhesive strips 68 and 70 so as not to expose the emulsion side of the negative 72 to the adhesive material. The emulsion side of the negative 72 may be placed in contact with the adhesive strips 68 and 70 where the adhesive is not damaging to the emulsion side.

When the peripheral edges of each film negative 72 are in contact with the adhesive strips 68 and 70, heat is applied to the card segment 12 by a suitable heat source 74 at station 76 for the heat activated adhesive. Applying heat to the strips 68 and 70 activates the adhesive to releasably engage the overlying portions of the negative 72. The nature of the adhesive on strips 68 and 70 permits the negative 72 to be removed from the card segment without damaging the negative 72.

After the film negatives 72 are secured to the adhesive strips 68 and 70 on the back surface 34 of each card segment 12, the web 14 containing the connected card segments 12 is forwardly advanced by an automatic card handler or mover, such as a tractor feed device 78 shown in FIG. 5. The tractor feed device 78 advances the negative mounted web 14 of cardstock for subsequent handling. The web 14 may in one mode be advanced to a supply station where the web with the negatives mounted thereon are stored in a fan-fold arrangement or in a roll for subsequent processing. In another mode the negative mounted web 14 is advanced directly without interruption to an inspection station 80 where the negatives are inspected for correct exposure, color balance and other criteria. Defective negatives 72 are removed from the web 14 of cardstock at this point by removing the card segments 12 containing the defective negatives from the web 14.

Following inspection of the mounted negatives 72, the web 14 of cardstock is fed to a film proofing machine generally designated by the numeral 82. A suitable proofing machine 82 for use with the present invention is sold by Hicks Equipment, Inc. of Flint, Mich. The proofing machine 82 produces a proof 84 which corresponds in composition to the portion of the film negative that is visible through the aperture 36 of the respective card segment 12. Thus, full image proofing of the mounted negatives 72 is accomplished without requiring individual handling of the negatives 72. The customer is able to inspect the content of the proof. If the content is unacceptable, then the negative 72 can be repositioned on the card segment 12. Thereafter, no handling of the negative is required. The image of the negative seen through the aperture will correspond to the image which will appear on the printed photograph. If the image is unacceptable, then the photographer can change it by repositioning the negative 72 on the aperture card 12. In this manner, any confusion in instructions on mounting the negatives and composition of proofs between the photographer and laboratory is avoided. In essence, the photographer remains in total control of cropping and composition selection.

Once the proofs 84 are printed the individual card segments 12 are retained in web form. Thereafter, the printed proofs 82 and corresponding connected card segments 12 are grouped together to form a completed order 86 for delivery to the studio/photographer. When received at the studio, if it is determined that the composition of a proof 84 is unsatisfactory, then the photographer repositions the film negative 72 on the card segment 12. Alternatively, the film negative 72 is positioned on another (cropped) aperture card having an aperture size which is less than the size of the aperture 36 of the card segments 12 cut from the web 14. The dimensions of the windows 36 of the card segments 12 are less than the full dimension of the film negatives so some initial cropping of the negatives occurs in the film negative mounting process. Nevertheless, full image mounting of the negatives 72 on the card segments 12 is obtained.

Once the order 86 is received by the studio/photographer card segments 12 can be separated from one another along the score lines 20. If additional track feeding of the individual card segments 12 is desired, suitable means can be employed to splice together the individual card segments 12 for continuous feeding of the spliced cards utilizing a tractor feed device engaging the holes 40.

As illustrated in FIG. 5, the printed proofs 84 and corresponding card mounted negatives 72 are placed in sequence and packaged as a single order 86 which is shipped to the photographer. Upon receipt of the proofs 84 and the carded negatives 72, the photographer may quickly isolate the carded negatives which yield unsatisfactory proofs. This will ideally be a small percentage of the batch of proofs received. The handling of the negatives 72 is efficiently accomplished by use of the card segments 12 which remain connected to one another in the web 14. The negatives 72 are not touched and remain in sequence, permitting faster handling of the card mounted negatives without damaging the negatives. The handling of the web 14 is facilitated by the provision of the score lines 20 which serve as hinges to permit relative movement and folding of the card segments 12 which remain connected.

The negative or negatives 72 that require modification are easily detached from the back surface 34 of the card segment 12. Preferably the adhesive that is used to form the adhesive strips 68 and 70 on the back surface 34 allows the negative to be removed without damaging the negative so that the integrity of the emulsion and clarity of the image is maintained. This provision facilitates "custom" cropping and composing the negatives while still maintaining cost effective machine print prices.

After a negative 72 is removed from a card segment 12, the photographer may reposition the negative 72 on the card segment 12. At this stage tape is used to hold the negative 72 in the desired position on the card segment 12 with respect to the window 36. In the alternative, the photographer may select another card from a group of aperture cards having a range of aperture sizes. These sizes correspond to the various film sizes which meet industry standards. A wide range of aperture card sizes are commercially available for mounting negatives to obtain the desired degree of cropping. This technique for customizing developed photographs allows the photographer to maintain total control of the selection of the composition of the printed photograph.

The cropping process can involve separating a film negative 72 from the card 12 and repositioning the negative 72 on the same card. If a new card is required with a cropped image, then the original aperture card 12 is placed over the cropped card to preserve the information that is printed on the front surface 32 of the card 12. In all cases, the negative 72 is reattached to the back surface 34 of the card 12. In this manner the photographer maintains total control in determining the desired composition of the photograph and the degree, if any, of cropping.

By utilizing the negatives 72 mounted on the cards 12 and comparing them with the corresponding proofs, the mounted negatives can continue to be used with the assurance that the print will correspond to the proofs. Consequently the laboratory is not required to "guess" or interpret what the photographer is seeking to capture in the composition of the print. The laboratory is able to work faster in developing the prints because no decisions are required to be made as to the content of the negative image to be exposed. This makes for an overall more efficient process for printing negatives. More importantly, by repositioning the film negatives 72 on the card segments 12, the negatives are not repeatedly handled, rather the card segments are handled. This preserves the quality of the mounted film negative. Not only is touching of the film negatives eliminated, but the mounted film negatives can be efficiently filed.

Once the composition of the film negative 72 visible through the window 36 is approved, the laboratory technician can efficiently fill the order without concern for the content of the developed photographs. By maintaining the negative on the aperture card, not only is printing production enhanced, but production at the retouching, analyzing, inspecting, sorting and packaging stations is enhanced. Furthermore, all print sizes and negative formats are capable of being printed at one sitting at the same time and processed simultaneously.

With the negatives mounted on the aperture cards, the negatives can be efficiently filed and retrieved for later processing. The aperture card is always matched with the mounted negative. Thus, the negative can be easily located and identified by the information printed on the card. Overall, the present invention provides increased productivity with reduced cost associated with handling aperture cards, while assuring maximum protection of the mounted negatives. Also, the tendency for confusion to develop in the processing of negatives between the photographer and the laboratory is substantially eliminated.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. Apparatus for mounting film negatives comprising, a roll of film negatives, said roll including a plurality of individual film negatives connected in a preselected sequential order, means for cutting said roll to separate said individual film negatives and feed said cut film negatives in said preselected sequential order, a web of cardstock having a substantially continuous length defined by longitudinal edges and a preselected width uniform along the length of said web, a plurality of transverse score lines extending in spaced parallel relation across the width of said web and spaced equidistant apart to form a plurality of connected card segments, said card segments being separable one from another along said score lines, said card segments having uniform dimensions where each card segment is defined by a top edge and a bottom edge formed by said web longitudinal edges and a leading edge and a trailing edge defined by said transverse score lines, tracks of holes in each card segment positioned closely adjacent and parallel to a selected one of said top and bottom edges, said tracks of holes of adjacent card segments being aligned to form a continuous track of holes at said longitudinal edges of said web for engagement with a tractor feed device for feeding said connected card segments along a feed path, an optical center point positioned on each card segment, alignment means on each card segment for locating said optical center point thereon so that said optical center points of said card segments are located in the same position on said respective card segments, a window of a preselected geometric shape in each card segment, said window having an area less than the area of the film negative positioned over the window with a portion of said card segment around said window receiving the periphery of the film negative, said window being located on said card segment in a preselected position with respect to said optical center point, means positioned adjacent to each of said windows for non-permanently bonding said individual film negatives separated from one another to said card segments in said preselected position overlying said windows, said individual film negatives maintained in the same sequential order on said card segments as the order of said film negatives in said roll, said card segments releasably receiving said film negatives permitting said individual film negatives to be repeatedly mounted and dismounted from said card segments to allow repositioning of a film negative on said window to select the composition of the film negative visible through said window, and said card segments maintaining said individual film negatives in said preselected order when mounted on said card segments while permitting said film negatives to be individually handled when dismounted from said card segments and then returned to a connected relationship on said card segments.

2. Apparatus as set forth in claim 1 which includes, means positioned in said web and extending parallel to said tracks of holes for separating the portion of said web containing said holes from said card segments to form an edge of each segment.

3. Apparatus as set forth in claim 2 in which, said tracks of holes extend along said top and bottom edges in strips, and a score line dividing said strips from said card segments to permit separation of said tracks of holes from said card segments to provide said top and bottom edge of each card segment free of holes.

4. Apparatus as set forth in claim 1 which includes, a hinge formed by said transverse score lines to permit folding of said web to position adjacent card segments in overlying relation for feeding said web from a folded stack.

5. Apparatus as set forth in claim 1 in which includes, tracks of holes in said web extending in spaced parallel relation to said transverse score lines, and means for severing said tracks of holes from said web upon separation of said card segments one from another along said score lines to provide said leading edge and said trailing edge of each card segment free of said tracks of holes.

6. Apparatus as set forth in claim 1 in which, said alignment means includes said tracks of holes extending in rows along said top and bottom edges of each card segment, said holes spaced a preselected distance apart and oppositely aligned so that pairs of holes are oppositely positioned on each card segment, said optical center point of each card segment being located along a first line extending between a selected pair of said holes at said top and bottom edges where said first line is in the same position on each card segment, said optical center point positioned on said first line a preselected distance from said top and bottom edges, and said window of each card segment being positioned thereon in a preselected orientation with respect to said optical center point.

7. Apparatus as set forth in claim 6 in which, said optical center point is located on the first line one half the distance between said selected pair of holes.

8. Apparatus as set forth in claim 6 which includes, registry means on each card segment for aligning said optical center with the center of a film negative attached to said card segment.

9. Apparatus as set forth in claim 1 in which, said means for releasably securing the film negative to said card segment includes an adhesive applied to one side of each card segment in said continuous web, said adhesive being applied to selected areas of said card segment around said window, and said adhesive having a composition permitting removal of the film negative to said card segment for selective positioning and repositioning of the film negative with respect to said optical center point of said card segment.

10. Apparatus for mounting film negatives comprising, a web of cardstock having a substantially continuous length defined by longitudinally edges and a preselected width uniform along the length of said web, a plurality of transverse score lines extending in spaced parallel relation across the width of said web and spaced equidistant apart to form a plurality of connected card segments, said card segments being separable one from another along said score lines, said card segments having uniform dimensions where each card segment is defined by a top edge and a bottom edge formed by said web longitudinal edges and a leading edge and a trailing edge defined by said transverse score lines, tracks of holes in each card segment positioned closely adjacent and parallel to a selected one of said top and bottom edges, said tracks of holes of adjacent card segments being aligned to form a continuous pattern of holes at said longitudinal edges of said web for engagement with a tractor feed device for feeding said connected card segments along a feed path, said pattern of holes repeated for each card segment where pairs of holes are oppositely positioned at said top and bottom edges of each card segment, an optical center point positioned on each card segment at a preselected position with respect to said tracks of holes, said optical center points of said card segments being located in the same position on said respective card segments, a window of a preselected geometric shape in each card segment and positioned on said card segment in a preselected position with respect to said optical center point, said optical center point located along a first alignment line extending between a selected pair of said holes where said first line is in the same position on each card segment and a second alignment line perpendicular to the first line and positioned a preselected distance from said card segment top and bottom edges, said second alignment line intersecting said first alignment line at a preselected point on said card segment to locate said optical center point, and said window of each card segment being positioned thereon in a preselected orientation with respect to said optical center point.

11. Apparatus as set forth in claim 10 which includes, means positioned in said web and extending parallel to said tracks of holes for separating the portion of said web containing said holes from said card segments to form an edge of each segment.

12. Apparatus as set forth in claim 10 in which, said tracks of holes extend along said top and bottom edges in strips, and a score line dividing said strips from said card segments to permit separation of said tracks of holes from said card segments to provide said top and bottom edges of each card segment free of holes.

13. Apparatus as set forth in claim 10 which includes, a hinge formed by said transverses score lines to permit folding of said web to position adjacent card segments in overlying relation for feeding said web from a folded stack.

14. Apparatus as set forth in claim 10 which includes, tracks of holes in said web extending in spaced parallel relation to said transverse score lines, and means for severing said tracks of holes from said web upon separation of said card segments one from another along said score lines to provide said leading edge and said trailing edge of each card segment free of said tracks of holes.

15. Apparatus as set forth in claim 10 in which, said optical center point is located on the first line one half the distance between said selected pair of holes.

16. Apparatus as set forth in claim 10 which includes, registry means on each card segment for aligning said optical center point with the center of a film negative attached to said card segment.

17. Apparatus as set forth in claim 10 which includes, an adhesive applied to one side of each card segment in said continuous web, said adhesive being applied to selected areas of said card segment around said window, and said adhesive having a composition permitting removal of the film negative to said card segment for selective positioning and repositioning of the film negative with respect to said optical center point of said card segment.

18. Apparatus for mounting film negatives comprising, a web of cardstock having a substantially continuous length defined by longitudinal edges and a preselected width uniform along the length of said web, a plurality of transverse score lines extending in spaced parallel relation across the width of said web and spaced equidistant apart to form a plurality of connected card segments, said card segments being separable one from another along said score lines, said card segments having uniform dimensions where each card segment is defined by a top edge and a bottom edge formed by said web longitudinal edges and a leading edge and a trailing edge defined by said transverse score lines, tracks of holes in each card segment positioned closely adjacent and parallel to a selected one of said top and bottom edges, said tracks of holes of adjacent card segments being aligned to form a continuous track of holes at said longitudinal edges of said web for engagement with a tractor feed device for feeding said connected card segments along a feed path, a window of a preselected geometric shape in each card segment, a portion of said card segment around said window for receiving peripheral edges of the film negative, feed means for conveying said web of cardstock from a supply of cardstock along said feed path into underlying relation with individual film negatives cut from a roll of negatives to position a film negative over each window where the sequence of film negatives on said card segments corresponds to the sequence of film negatives connected in the roll, and adhesive means applied to a selected portion of said card segment around said window for removably attaching the film negative on said card segment overlying said window to permit repeated mounting and dismounting of the film negative on said card segment for adjusting the position of the film negative relative to said window without damage thereto while maintaining the film negatives on said connected card segments in the same sequence as when connected in the roll.

19. Apparatus as set forth in claim 18 which includes, an optical center point of each card segment located within said window, and registry means on each card segment for aligning said optical center point with a center of the film negative to selectively position the film negative for attachment to said card segment.

20. Apparatus as set forth in claim 19 in which, said adhesive means is applied to one side of each card segment in said continuous web, said adhesive means is applied to selected areas of said card segment around said window, and said adhesive means having a composition permitting removal of the film negative to said card segment for selective positioning and repositioning of the film negative with respect to said optical center point of said card segment.

* * * * *

UNITED STATES PATENT AND TRADEMARK OFFICE
CERTIFICATE OF CORRECTION

PATENT NO : 5,413,665

DATED : May 9, 1995

INVENTOR(S) : Ralph R. Gaetano

It is certified that error appears in the above-identified patent and that said Letters Patent is hereby corrected as shown below:

Column 6, line 24 after "is" delete 'a'.

Column 13, line 58 delete 'in which' and insert -- which --.

Column 14, line 39 delete 'longitudinally' and insert -- longitudinal --.

Signed and Sealed this

Twenty-fourth Day of March, 1998

*Attest:*

BRUCE LEHMAN

*Attesting Officer* *Commissioner of Patents and Trademarks*